United States Patent
Park

(10) Patent No.: US 10,053,133 B2
(45) Date of Patent: Aug. 21, 2018

(54) VEHICLE STEERING WHEEL COVER ASSEMBLY

(71) Applicant: Ki Wan Park, Seoul (KR)

(72) Inventor: Ki Wan Park, Seoul (KR)

( * ) Notice: Subject to any disclaimer, the term of this patent is extended or adjusted under 35 U.S.C. 154(b) by 71 days.

(21) Appl. No.: 15/111,119

(22) PCT Filed: Jul. 10, 2015

(86) PCT No.: PCT/KR2015/007188
§ 371 (c)(1),
(2) Date: Jul. 12, 2016

(87) PCT Pub. No.: WO2016/017960
PCT Pub. Date: Feb. 4, 2016

(65) Prior Publication Data
US 2016/0332656 A1 Nov. 17, 2016

(30) Foreign Application Priority Data
Jul. 28, 2014 (KR) .......................... 10-2014-0095631

(51) Int. Cl.
*B60L 1/02* (2006.01)
*B62D 1/06* (2006.01)

(52) U.S. Cl.
CPC ............... *B62D 1/065* (2013.01); *B60L 1/02* (2013.01)

(58) Field of Classification Search
CPC .................................. B62D 1/065; B60L 1/02

USPC ........ 219/202, 204, 209, 494, 497, 507, 535
See application file for complete search history.

(56) References Cited

U.S. PATENT DOCUMENTS

| | | | |
|---|---|---|---|
| 7,517,222 | B2 | 4/2009 | Rohrbach et al. |
| 2007/0072443 | A1 * | 3/2007 | Rohrbach .......... H01R 13/6205 439/39 |

FOREIGN PATENT DOCUMENTS

| | | | |
|---|---|---|---|
| KR | 20-0411993 | B1 | 3/2006 |
| KR | 200411993 | * | 3/2006 ............... B62D 1/06 |
| KR | 10-2009-0032192 | A | 9/2007 |
| KR | 10-1081544 | B1 | 11/2011 |
| KR | 10-1167513 | B1 | 7/2012 |
| KR | 101167513 | * | 7/2012 ............... B62D 1/00 |

OTHER PUBLICATIONS

International Search Report dated Oct. 20, 2015 for PCT application No. PCT/KR2015/007188.

* cited by examiner

*Primary Examiner* — Phuong Nguyen
(74) *Attorney, Agent, or Firm* — Thomas J. Engellenner; Reza Mollaaghababa; Pepper Hamilton LLP

(57) ABSTRACT

The present invention relates to a vehicle steering wheel cover assembly and, particularly, to a vehicle steering wheel cover assembly in which a first electric connecting part and a second electric connecting part are connected to each other by means of magnetic force in order to supply power to a heater installed in the steering wheel cover, to thereby keep the structure simple and also allow the manufacturing cost to be kept low.

2 Claims, 3 Drawing Sheets

VEHICLE STEERING WHEEL COVER ASSEMBLY

CROSS-REFERENCE TO RELATED APPLICATIONS

This application claims priority to PCT Application No. PCT/KR2015/007188, filed Jul. 10, 2015, which claims priority to Korean Patent Application No. 10-2014-0095631 filed on Jul. 28, 2014, which are hereby incorporated by reference in their entirety for all purposes as if fully set forth herein.

FIELD OF THE INVENTION

The present invention relates to a vehicle steering wheel cover assembly, more particularly, to a vehicle steering wheel cover assembly in which a first electric connecting part and a second electric connecting part are connected to each other by means of magnetic force in order to supply power to a heater installed in the steering wheel cover, to thereby keep the structure simple and also allow the manufacturing cost to be kept low.

BACKGROUND

A warm steering wheel cover of the prior art is suggested in Korea Unexamined Patent Publication N0. 2005-0100835.

A power connecting part is provided in the upper side of the steering wheel rotating part and the vehicle body fixing part so that it can be operated by the power applied from the cigar jack, and configured to generate heat in the steering wheel cover as the surface heating element installed inside the steering wheel cover is being operated by using the power applied from the power connecting part, wherein the power connecting part comprises: a power supply connecting portion being installed in the upper side of the steering wheel rotating part, and a power supply plug portion being installed in the upper side of the vehicle body fixing part, wherein supplying of power being applied to the power supply plug portion is accomplished within the range of contact angle, wherein the power supply connecting portion comprises: a power supply connecting body being fixed in the upper side of the steering wheel rotating part, and a connecting support plate provided with a connecting terminal plate being installed in the front side of the power supply connecting body, wherein the power supply plug portion comprises: a power supply plug body located in the upper side of the vehicle body fixing part and provided with a connecting inlet; a connecting terminal shaft connected with the connecting terminal plate so that it is coupled with the connecting inlet of the power supply plug body so as to electrically apply the power of (from) the cigar jack; and an adjusting bolt coupled with the back side portion of the connecting terminal shaft and installed therein so as to push the connecting terminal shaft to have a continuous contact with the connecting terminal plate.

However, there is a problem in such a warm steering wheel cover of the prior art that the structure of the power connecting part is complicated.

In order to solve such problem, it is suggested that a wireless power receiving module is provided in the power connecting part as suggested in Korea Registered Patent 1081544, however, there is a problem that providing such wireless power receiving module will increase the manufacturing cost.

LEADING TECHNICAL LITERATURES

Patent Literature

[Patent Literature 1] Korea Unexamined Patent Publication No. 2005-0100835
[Patent Literature 2] Korea Registered Patent Publication No. 1081544

SUMMARY OF INVENTION

An objective of the present invention devised to solve above described problems is to provide a vehicle steering wheel cover assembly wherein a simple structure can be maintained, and the manufacturing cost can be kept low as well.

For achieving the above described objective, a vehicle steering wheel cover assembly of the present invention comprises: a steering wheel cover, a heater installed in the steering wheel cover, a first electric connecting part connected to the heater; and a second electric connecting part whose one end is connected to the power supply of the vehicle, and the other end is connected to the first electric connecting part, wherein the first electric connecting part and the second electric connecting part are connected to each other by means of magnetic force in order to supply power to the heater.

A coil part may be formed between the one end and the other end of the second electric connecting part.

According to the vehicle steering wheel cover assembly of the present invention as described heretofore, there are advantageous effects as follows.

The first electric connecting part and the second electric connecting part are connected to each other by means of magnetic force and supply power to the heater installed in the steering wheel cover, the twisting of the electric wires connected to the heater is prevented even when the steering wheel is being rotated, and at the same time, a simple structure can be maintained, and the manufacturing cost can be kept low as well. In addition, the steering wheel cover can be easily installed in the general purpose vehicles.

A coil part is formed between the one end and the other end of the second electric connecting part, to thereby keep the structure simple and also allow that when the driver rotates the steering wheel within a certain angle, the other end of the second electric connecting part can be moved along the first electric connecting part, therefore, the first electric connecting part and the second electric connecting part are connected without separation if the steering wheel is rotated within a certain angle, and thus, the convenience during usage is further enhanced.

DETAILED DESCRIPTION

Hereinafter, a preferred exemplary embodiment of the present invention will be described in detail with reference to the accompanying drawings as follows.

For reference, among the elements of the present invention which will be described hereinafter, a separate detailed description will be omitted for the elements which are same as those of the prior art, but instead will be referred to the previously described prior art.

Figure 1:
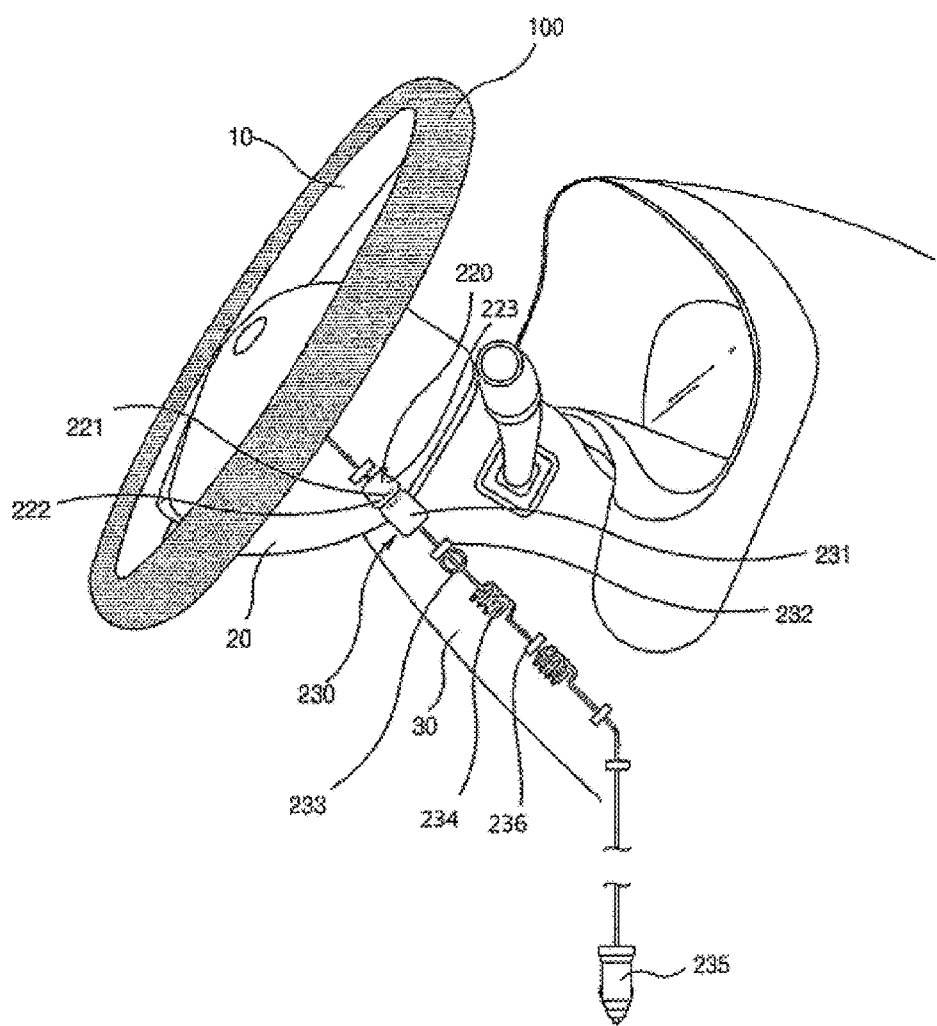
FIG. 1 is a perspective view of a vehicle steering wheel cover assembly according to a preferred exemplary embodiment of the present invention.
Figure 2:
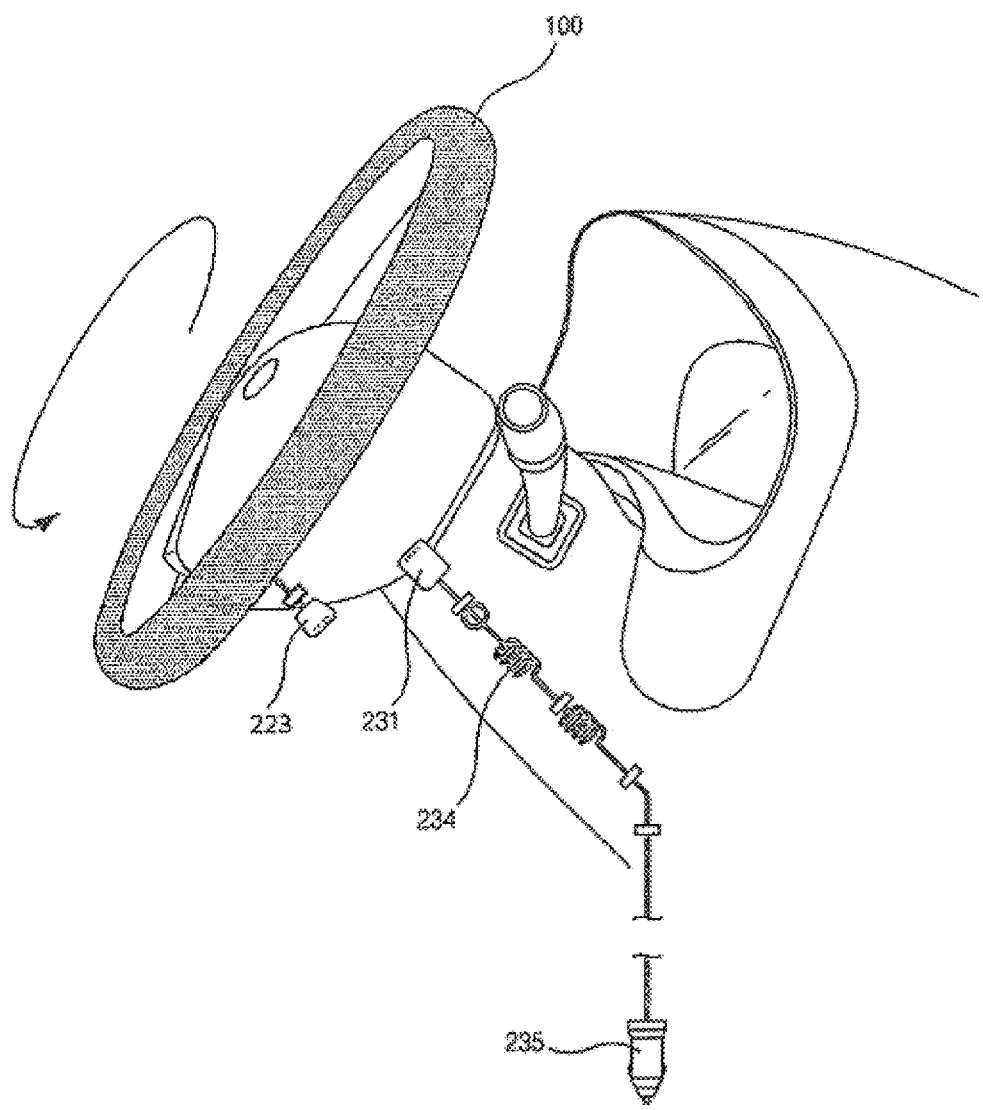
FIG. 2 is a perspective view of a vehicle steering wheel cover assembly according to a preferred exemplary embodiment of the present invention illustrating a state wherein the first electric connecting part and the second electric connecting part are separated when the steering wheel is being rotated by the driver more than a certain angle.
Figure 3:
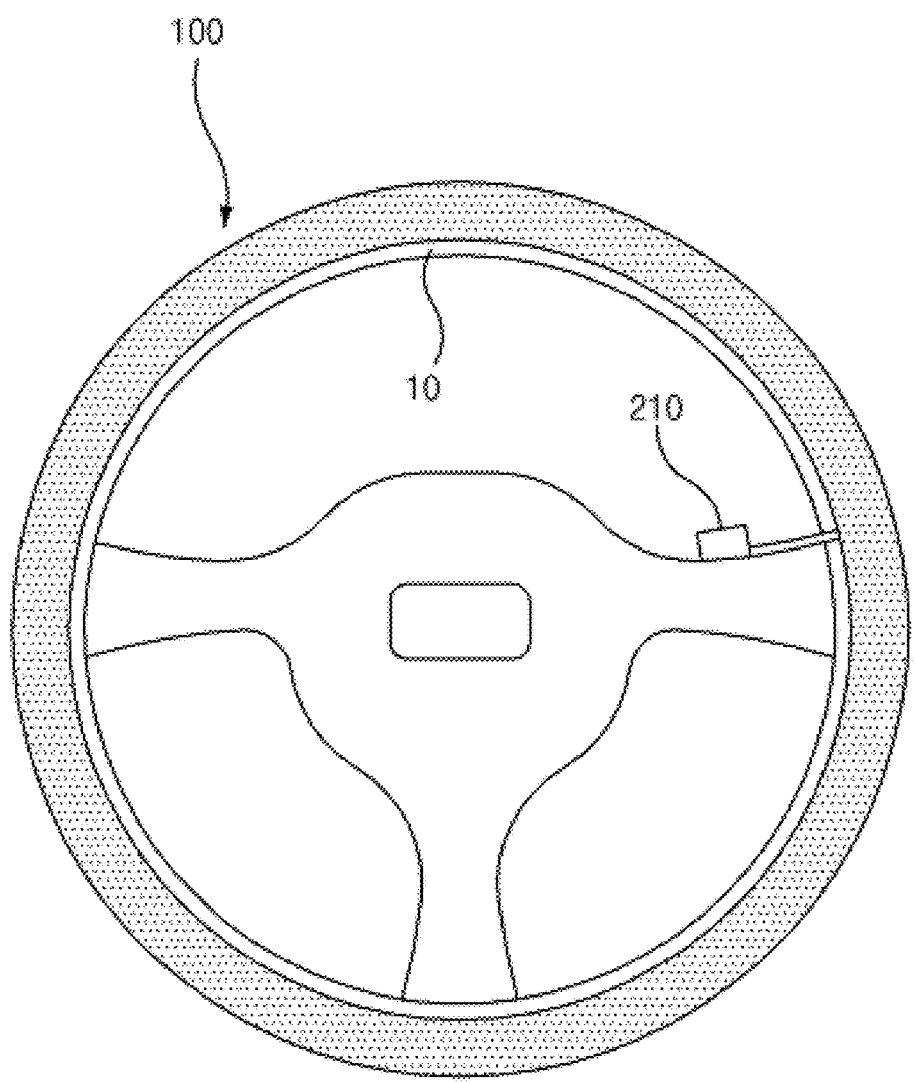
FIG. 3 is a front view of a vehicle steering wheel cover assembly according to a preferred exemplary embodiment of the present invention.

As illustrated in FIGS. 1 to 3, the vehicle steering wheel cover assembly of the exemplary embodiment of the present invention characterized in that and comprises: a steering wheel cover 100, a heater (not shown) installed in the steering wheel cover 100, a first electric connecting part 220 connected to the heater, and a second electric connecting part 230 whose one end is connected to the vehicle power supply and the other end is connected to the first electric connecting part 220, wherein the first electric connecting part 220 and the second electric connecting part 230 are connected to each other by means of magnetic force in order to supply power to the heater.

The steering wheel cover 100 encompasses the outer circumferential surface of a steering wheel 10.

The heater is installed inside the steering wheel cover 100 so that the steering wheel 10 can be kept warm.

The first electric connecting part 220 is fixedly installed in the steering wheel rotating part 20 wherein the steering wheel 10 is installed.

The other end of the first electric connecting part 220 is connected to the heater.

In the one end of the first electric connecting part 220, a first power supply connecting portion 223 is formed.

At the free end of the first power supply connecting portion 223, a first magnet 221 and a first connecting terminal 222 are installed so as to be disposed in the both sides of the first magnet 221.

Unlike this, diverse arrangement method can be applied to have an arrangement structure such as a cylindrical magnet encompassing two connecting terminals, or a set of magnet respectively disposed in the upper side and the lower side of the two electrodes, or a magnet disposed between the two connecting terminals wherein two connecting terminals are circularly formed in a way that one connecting terminal is disposed inside the other connecting terminal (disposed as two concentric circles), or the like.

Meanwhile, when electric current flows through the heater a heat is generated therein, and the heater will be operated normally even if the first connecting terminal 222 is switchedly connected during the course of rotating the steering wheel since when electric current flows through the heater a heat is generated thereby, regardless of flow direction, as long as the both ends thereof (of the heater) are connected to the positive and the negative electrodes regardless of their polarities.

The wire portion connected to the first power supply connecting portion 223 is fixedly installed in the steering wheel rotating part 20.

One end of the second electric connecting part 230 is connected to the vehicle power supply, and the other end thereof is connected to the first power supply connecting portion 223 of the first electric connecting part 220. A cigar jack can be the vehicle power supply.

The second electric connecting part 230 can be installed to the vehicle body fixing part 30 by using a tape or a double sided tape or the like.

A cigar jack connecting portion 235 is formed in the one end of the second electric connecting part 230, and connected to the cigar jack.

A second power supply connecting portion 231 is formed in the other end of the second electric connecting part 230.

A second magnet is installed in the second power supply connecting portion 231 at the location corresponding to the first magnet 221.

Unlike the previous description, a magnet is provided to either one of the second power supply connecting portion 231 and the first power supply connecting portion 223, and a substance attracted by a magnet (magnetic material) can be provided in the other one.

A second connecting terminal is installed in the second power supply connecting portion 231 at the location corresponding to the first connecting terminal 222.

The second magnet and the second connecting terminal, and the first magnet 221 and the first connecting terminal 222 are respectively installed inside the first power supply connecting portion 223 and the second power supply connecting portion 231 in a way that the surfaces facing each other are exposedly installed so as to be in contact with each other.

Due to such configuration, as illustrated in FIG. 1, when the first power supply connecting portion 223 and the second power supply connecting portion 231 are being closely approached the second magnet is coupled (connected) to the first magnet 221 by means of magnetic force. Therefore, the second connecting terminal is connected to the first connecting terminal 222, and the vehicle power supply can be supplied to the heater thereby. When the power is supplied to the heater, the steering wheel cover 100 becomes warm, and thus the driver's convenience is enhanced thereby in a cold season like winter.

Further, a coil part 234 is formed between the cigar jack connecting portion 235 of the second electric connecting part 230 and the second power supply connecting portion 231. The coil part 234 becomes elastic due to the shape of a coil.

Moreover, a steel wire can be further inserted inside the coil part for imparting a strong elasticity thereto, in addition to the electric wire connecting the cigar jack connecting portion 235 and the second power supply connecting portion 231. Owing to this, the second power supply connecting portion 231 can be returned more smoothly.

Owing to such coil part 234 the second electric connecting part 230 becomes stretchable.

Due to this, when the driver rotates the steering wheel 10 within a certain angle, the second power supply connecting portion 231 is being stretched so as to follow the first power supply connecting portion 223, and the electrical connection is maintained thereby.

As illustrated in FIG. 2, when the driver rotates the steering wheel 10 in excess of a certain angle, the second power supply connecting portion 231 and the first power supply connecting portion 223 are separated from each other, and after the separation the second power supply connecting portion 231 is being returned to its original position due to the elastic force of the coil part 234.

In addition, a guide portion 233 for guiding the second power supply connecting portion 231, a first stopper portion 232 stopped by the guide portion 233, and a second stopper portion 236 for preventing the second power supply connecting portion 231 from being pulled out in excess of a certain length may be provided.

A ring, through which the wire disposed between the second power supply connecting portion 231 and the coil part 234 is penetrating, can be provided as the guide portion 233.

The guide portion 233 is fixedly installed in the vehicle fixing part by using a double sided tape or a tape or the like.

Due to this, in the second electric connecting part 230, the portion between the second power supply connecting portion 231 and the coil part 234 is slidingly installed against the vehicle fixing part 30.

The first stopper portion 232 can be protrudedly in the electrical wire between the guide portion 233 and the second power supply connecting portion 231.

When the second power supply connecting portion 231 is being returned, it is guided by the guide portion 233, and at the same time, it can be easily returned to the original position when the return is being completed since the first stopper portion 232 is being stopped by the guide portion 233.

Thus, if the steering wheel 10 is repositioned to its original location after it has been rotated by the driver, the first power supply connecting portion 223 is automatically connected to the second power supply connecting portion 231.

The second stopper portion 236 can be formed by fixing the middle portion of the coil part 234 to the vehicle fixing part 30.

The second power supply connecting portion 231 is allowed to be stretched within a predetermined length since it cannot be pulled out due to the second stopper portion 236 fixed to the vehicle fixing part 30 when the second power supply connecting portion 231 is stretched in excess of the predetermined length.

In this way, the vehicle steering wheel cover assembly according to the exemplary embodiment of the present invention prevents twisting of the electric wires connected to the heater even when the steering wheel 10 is being rotated by the driver, and at the same time, a simple structure can be maintained, and the manufacturing cost can be kept low as well.

Further, as illustrated in FIG. 3, in the one side of the handle 10, a switch 210 is installed capable of turning on and off the heater. The switch 210 is disposed between the both ends of the first electric connecting part 220.

As described in detail, although the present invention is described with reference to the preferred exemplary embodiment, it will be apparent to the person of ordinary skill in the art that various changes and alterations of the present invention can be made without departing from the spirit and the scope of the present invention written in the claims described herein below.

DESCRIPTION OF SYMBOLS

Description of numerals for major elements in drawings
100: steering wheel cover
210: switch
220: first electrical connecting part
230: second electrical connecting part
234: coil part

What is claimed is:

1. A vehicle steering wheel cover assembly characterized in that and comprising:
a steering wheel cover;
a heater installed in the steering wheel cover;
a first electric connecting part connected to the heater; and
a second electric connecting part whose one end is connected to a power supply of the vehicle, and the other end is connected to the first electric connecting part,
wherein the first electric connecting part and the second electric connecting part are connected to each other by means of magnetic force in order to supply power to the heater, wherein a guide portion for guiding the second power supply connecting portion is included, and
wherein a coil part is provided in the second electric connecting part in a way that the electrical connection is maintained as the second electric connecting part is stretched when the steering wheel is rotated within a certain angle; and a stopper portion which prevents the second electric connecting part from being withdrawn further than a predetermined length is provided in a way that the first electric connecting part and the second electric connecting part are separated when the steering wheel is rotated in excess of the certain angle; and the second electric connecting part is returned to its original position after the separation of the first electric connecting part and the second electric connecting part; and the second electric connecting part is guided by the guide portion when returning to its original position after separation from the first electrical connecting part.

2. The vehicle steering wheel cover assembly according to claim 1,
wherein the second electric connecting part is returned to its original position by the elastic force of the coil part formed between the one end and the other end of the second electric connecting part, and
wherein the second electric connecting portion is stretched by the coil part, and a switch which turns the heater on and off is connected to the first electric connecting part.

* * * * *